United States Patent [19]

DiIanni et al.

[11] Patent Number: 4,605,859

[45] Date of Patent: Aug. 12, 1986

[54] RADIATION MEASURING APPARATUS

[75] Inventors: Elmo J. DiIanni, Mountain Lake, N.J.; Harold J. Cooley, Spring Valley, N.Y.; Michio Fujita, Philadelphia, Pa.; Charles V. Noback, Cresskill, N.J.

[73] Assignee: Nuclear Research Corp., Warrington, Pa.

[21] Appl. No.: 562,985

[22] Filed: Dec. 19, 1983

[51] Int. Cl.$^4$ .............................................. G01T 1/18
[52] U.S. Cl. .................................... 250/374; 250/375; 250/386
[58] Field of Search ........................ 250/374, 375, 386

[56] References Cited

U.S. PATENT DOCUMENTS

| 2,858,448 | 10/1958 | Brown et al. | 250/374 |
| 4,260,892 | 4/1981 | Kovacs et al. | 250/374 |
| 4,453,076 | 6/1984 | Jackson et al. | 250/374 |

FOREIGN PATENT DOCUMENTS 2080944 7/1981 United Kingdom ............... 250/374

Primary Examiner—Alfred E. Smith
Assistant Examiner—Richard Hanig
Attorney, Agent, or Firm—Walter B. Udell

[57] ABSTRACT

This invention describes apparatus for and a method of measuring radiation field strength which uses a pulse enabled detector (e.g. G-M tube) and is based on the equation $R=K/t$, where R is the radiation field strength, t is the time till first strike, and K is a proportionality constant for the given apparatus. The G-M detector is enabled by pulsing the bias voltage across the detector up into its active region and then measuring the elapsed time interval to the incident of first strike. Since the reciprocal of this time is proportional to the radiation field strength, all information necessary to determine the field strength has been obtained. A constant wait time is employed after each strike to assure that the G-M tube full recovery time has expired, and the G-M tube is then enabled and the process repeated. Because of the random nature of radiation phenomena the confidence level that any given measurement is an accurate representation of the true average field strength is low. Many measurements are taken and averaged for high confidence factors. For low fields, the lost time due to the deliberate "wait after strike" is a small percentage of the total time, so is of little consequence. In high fields, the "time to strike" is short, so many measurements can be made, again rendering the lost time of little significance.

30 Claims, 1 Drawing Figure

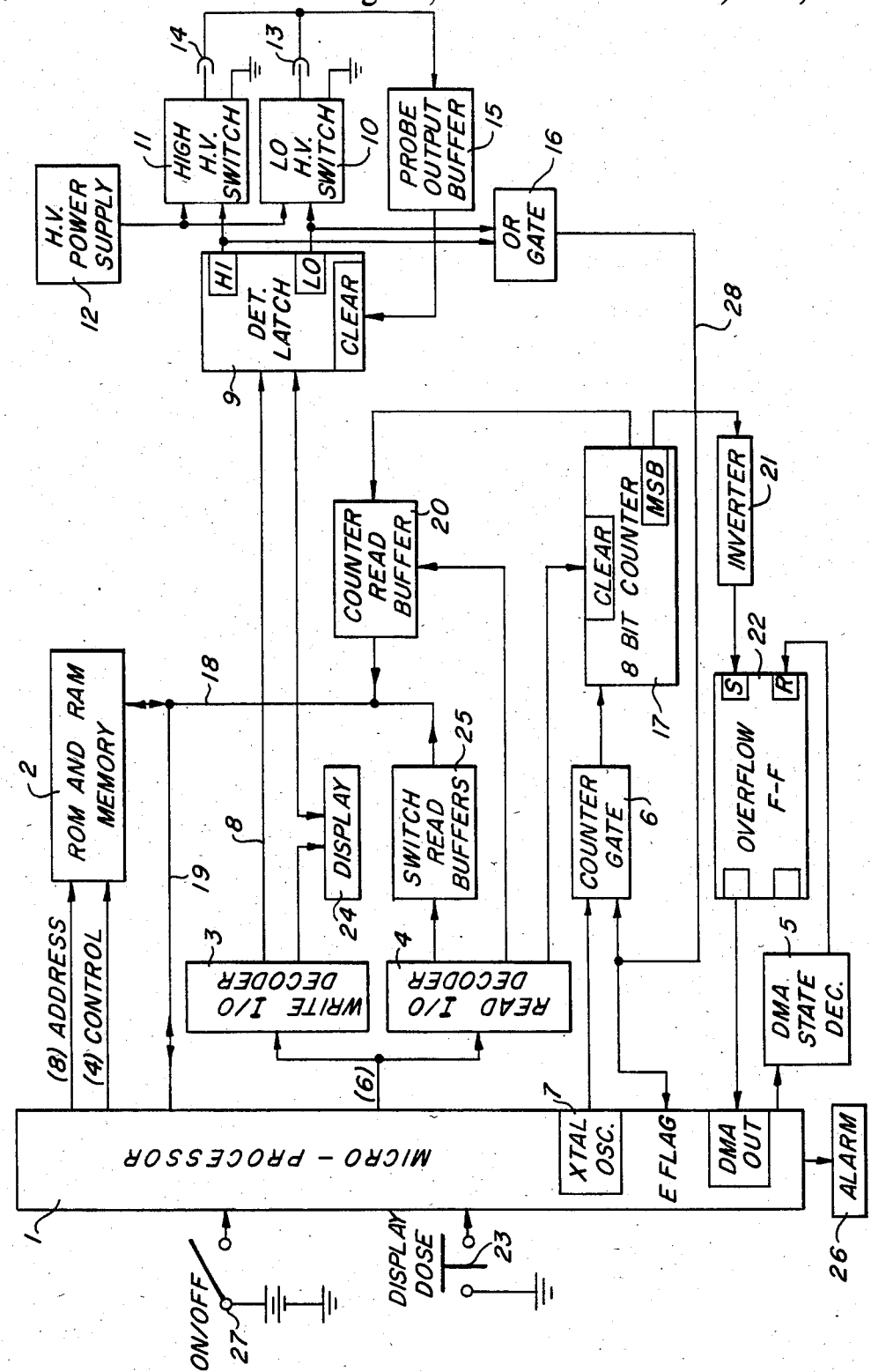

RADIATION MEASURING APPARATUS

BACKGROUND OF THE INVENTION

1. Field of Invention

This invention relates to the field of nuclear radiation measurement. Nuclear source strength is defined in terms of the number of atom disintegrations per unit of time. Typically, these disintegrations result in alpha ($\alpha$), beta ($\beta$), gamma ($\gamma$), or neutron radiation fields. Detection and measurement of these field strengths has been the objective of radiation measurement apparatus, and detectors to sense and measure these fields traditionally have employed the interaction or absorption of energy from these fields. This invention describes apparatus for, and a method of, using a Geiger-Mueller tube (G-M) detector over a wide range of field strengths while circumventing the limitations traditionally encountered in the use of such devices at the high field regions of interest.

2. Prior Art

Detectors for sensing radiation fields have included ion chambers, proportional counters, Geiger Mueller tubes, scintillation crystals and solid-state semiconductors. Each has advantages and disadvantages, and selection of a detector has been affected by the particular application. A single measurement apparatus for measuring radiation fields from very low intensity to extremely high intensity is highly desirable, but has been difficult to achieve due to the limiting physics phenomena of the various detectors at either the high or low regions of interest.

G-M tubes have served as simple, rugged, dependable detectors. Traditionally, G-M tubes are biased with a high voltage to create a high field strength between the anode and cathode electrodes, which field strength is chosen to be below that which causes self-ignition, but high enough so that the interaction with a nuclear particle/wave is sufficient to result in a discharge within the tube. This discharge pulse is sensed and counted with appropriate support electronics. After the discharge, the electric field is restored and subsequent events can occur and similarly be counted. The rate of discharges is measured (counted) and used as a measure of the nuclear field strength.

Limitations occur at high fields since the G-M tube exhibits an inactive or dead time just following a discharge. This dead time limitation is further complicated by the fact that its extent is a function of the field strength. This phenomenon can actually result in complete crippling of the ability of a G-M tube to function at high fields. Dead time correction via electronics is a difficult task due to its non-linear character.

SUMMARY OF THE INVENTION

Because of their simplicity, ruggedness and dependability, G-M tubes are highly desirable as radiation detectors. The useful life of G-M detectors can be expressed as a total number of discharges (e.g. $10^{10}$ to $10^{12}$). This results in short detector life when used conventionally in high radiation fields, that is, by counting discharges. The method according to the invention limits the number of discharges in high radiation fields by the insertion of a fixed wait time between discharges. Even though the time to discharge is short, the time interval between discharges becomes dominated by the wait time. This has the effect of significantly increasing the detector life.

Another drawback of using G-M detectors in high radiation fields in the previously known modes of use is the occurrence of partial amplitude discharges resulting from incomplete recovery of the G-M detector from a previous discharge. Since the amplitude of these pulses varies, the counting apparatus normally used to count discharges displays erratic counting. The apparatus according to the invention eliminates this problem. Additionally, at very high radiation fields, the G-M detector becomes totally saturated and therefore crippled. This crippling results in an erroneous low or zero reading even though a high field exists. As a result of the fixed wait time between discharges utilized in the present invention the G-M detector is operable at arbitrarily high radiation fields.

Moreover, the known types of devices do not in general present a linear meter scale and require the generation of a closely controlled, narrow high voltage pulse. While both the linearization of the readout and the generation of the high voltage pulse can be accomplished, the techniques required add to the component count, overall equipment complexity, and necessity of scale-changing for each decade covered. The apparatus and method according to the invention enables an inherently precise linear readout over many decades of operation with only one ranging operation required.

This invention describes apparatus for and a method of measuring nuclear field strength which uses a pulse enabled detector (e.g. G-M tube) and is based on the equation $R = K/t$, where R is the radiation field strength, t is the time till first strike, and K is a proportionality constant for the given apparatus. The G-M detector is enabled by pulsing the bias voltage across the detector up into its active region and then measuring the elapsed time interval to the incident of first strike. Since the reciprocal of this time is proportional to the radiation field strength, all information necessary to determine the field strength has been obtained. A constant wait time is employed after each strike to assure that the G-M tube has fully recovered, and the G-M tube is then enabled and the process repeated.

Because of the random nature of nuclear phenomena, even though each timed interval to strike contains all the necessary information to calculate the radiation field strength, the confidence level that any given measurement is an accurate representation of the true average field strength is low. Many measurements are, therefore, taken and combined for high confidence factors. For low fields, the lost time due to the deliberate "wait after strike" is a small percentage of the total time, so is of little consequence. In high fields, the "time to strike" is short, so many measurements can be made, again rendering the lost time of little significance. The fineness to which the time can be measured and the minimum time measurable limits the accuracy and maximum radiation field that can be measured. The non-linearity and lack of repeatability that is normally encountered as a result of G-M tube dead time no longer is present.

Accordingly it is a primary object of the invention to provide novel detector apparatus for and a method of measuring radiation fields by counting the time which elapses between the enabling of a detector device to record an interaction with a radiation particle or wave and the first actual interaction which thereafter occurs.

Another object of the invention is to provide a novel apparatus and method of measuring radiation fields as aforesaid wherein upon occurence of the first interaction the detector apparatus is disabled for a predetermined time and is then again enabled and the time counting process repeated until the next interaction occurs, the enabling and disabling sequences being continued and the time counts being averaged to provide a measurement of the radiation field.

A further object of the invention is to provide a novel apparatus according to the method of the invention as aforesaid while utilizes a Geiger-Mueller tube in the detector apparatus, and in which the time between disabling the detector and subsequently enabling the detector is longer than the full recovery time of the Geiger-Mueller tube.

Yet another object of the invention is to provide a novel radiation measuring apparatus which provides a precise linear readout over many decades of operation with only a single ranging change required, which demonstrates significantly increased detector life with high accuracy and stability, and has the ability to function accurately in very high radiation fields.

The foregoing and other objects of the invention will become clear from a reading of the following specification in conjunction with an examination of the appended drawing which is a functional block diagram of the novel apparatus according to the invention which carries out the novel method of the invention.

The apparatus and method according to the invention, as previously stated, is based upon the equation $R = K/t$, where R is the radiation field strength, t is the time till the first strike after the G-M tube is enabled, and K is a proportionality constant. This equation is derived from the proven mathematical expression $$\% \text{ Coincidences} = 1 - e^{-nRt}$$

which relates the expected count rate in terms of the probability of obtaining a count (% coincidence) to the radiation field R in milli-Roentgens, the detector sensitivity n in counts per second per mr per hour, and t, the observation time in seconds.

Since, if one waits long enough there will always occur a count, if even from background radiation, the probability of getting a count is certain, and the % coincidence can be written as a constant. Thus, the above equation becomes $$K_1 = 1 - e^{-nRt}$$

Since n = the G-M tube sensitivity and is a constant based on the tube size and construction, the equation then reduces to $$K_1 = 1 - e^{-K_2 Rt}$$

where
R = radiation field strength (mr/hr) and
t = observation time (seconds)
Since two of the three terms in the equation are constants, the third must also be a constant, and therefore $$e^{-K_2 Rt} = K_3 = \text{a constant}$$

Thus, it can be seen that if $e^{-K_2 Rt}$ is a constant, the exponent of e must also be a constant and we may write:

$$-K_2 Rt = K_4$$

or $$Rt = K_4/-K_2 = K_5 = K$$

and, $$R = K/t$$

where
R = radiation field strength and
t = time to obtain a G-M count,
or the radiation field intensity is proportional to the reciprocal of the time required to obtain a G-M count.

This equation states that the field intensity is measured by every G-M count by observing the time required to get the G-M count from the time t−0 when the detector is able to respond to an incident gamma photon (or beta electron). Looking at a single event of a random nature would of course be statistically unreliable, particularly in the low ranges where the time to count is relatively long. However, if this measurement is made repetitively over a defined period of time, for example two seconds, and the sum of the counts obtained during the total time that the G-M tube is active during all of the sequences in which counts are taken, there results a measurement which is a statistically reliable indication of the radiation field strength. Therefore, the last equation can be restated:

$$R_T = \frac{K \times \Sigma \text{COUNTS}}{\Sigma t_{ON}}$$

where
$R_T$ = Radiation intensity over the defined time period (I.E. 2 seconds)
$t_{ON}$ = G-M tube "on time" to register each "strike" during the defined time period
This relationship forms the basis of the invention.

Consider the following operation of a G-M tube: At time t=0, the G-M tube voltage is abruptly raised from below the starting voltage to a level within the operating voltage range. At the same time as the increase in tube voltage is applied, an oscillator (clock) is gated-on, and time, in the form of clock pulses, starts being counted. The time counting process continues until a G-M count is obtained, at which point the time counting is stopped and the G-M tube voltage is reduced to below its operating point. The voltage is kept depressed for about 1.5 msec (a time longer than the tube dead time) and then the process is repeated. In this way, the detector is made selectively sensitive and the "time to count" information is accumulated over a particular time interval. In high radiation fields, a G-M count will be obtained quite rapidly, in the order of a few microseconds or less; in low level radiation fields, the time to obtain a G-M pulse may extend to as much as a second or more depending on the actual field level and the G-M tube sensitivity. However, it can be seen that by simply counting time for whatever period is required, the G-M tube can be used over many decades without range changing, the limitation being the ability to measure extremely short time intervals reliably.

It is also evident that since the detector is permitted to count at the same rate as in D.C. operation, the number of counts per second increases as the field increases, and, as distinguished from the prior used modes of pulsed operation of G-M tubes, the counting rate is not limited by a controlling repetition rate of applied high voltage pulses to the G-M tube. In this approach, the G-M tube is essentially allowed to "free run", that is, count as rapidly as the radiation field dictates with the only limit being the imposed recovery time occurring after the receipt of each G-M pulse. Therefore, the statistics associated with any radiation field readings are maximized.

Turning now to a consideration of the functional block diagram of a radiation measuring apparatus which embodies the invention there is seen a Micro-processor 1 which controls all of the operations of the apparatus through the other components, which include a ROM and RAM Memory 2, a Write I/O Decoder 3, a Read I/O Decoder 4, a DMA State Decoder 5, and a Counter Gate 6. The eight Address lines to the Memory 2 are multiplexed to function as sixteen lines. The Write I/O Decoder 3 tells the Detector Latch 9 and the Display 24 when to read data from the Data Bus 18. The Read I/O Decoder 4 selects when count data is read onto the Data Bus, and also clears the Counter 17 at the appropriate times. The Memory EPROMs contain the Program and the RAM is used for transient data. A crystal oscillator 7 provides one microsecond timing clock pulses to the Micro-processor 1 and to the Counter gate 6 for respectively timing the operations of the apparatus and the "time to strike". The oscillator circuitry is internal in the Micro-processor although the crystal is external.

The Micro-Processor, through Write I/O Decoder 3, line 8, Detector Latch 9 and the Data Bus 18, selects which of the High Voltage switches 10 or 11 will be closed to apply voltage from Power Supply 12 through a capacitor to pulse bias G-M tube 13 or 14 for operation. The strikes detected by the G-M tubes are shaped by the Probe Output Buffer 15 and passed to the CLEAR input of the Detector Latch 9 to clear the Latch and drive the HI and LO outputs low to disable the active G-M tube by discharging it through the Switch. A pair of transistor switches provide the bias and discharge functions within each High Voltage Switch 10 and 11. When either of the HI or LO latch outputs is up, a signal is routed through OR Gate 16 to open the Counter Gate 6. When both HI and LO Latch outputs are down, the Counter Gate is closed. Accordingly, a strike closes the Counter Gate 6 and stops the count in the Counter 17. The Counter 17 receives and counts timing clock pulses through the Counter Gate 6 when the latter is open.

The eight line Data Bus 18, under control of the Micro-Processor 1, carries "count" information to the Memory 2, the count information also being routed via line 19 directly to the Micro-processor as it is being transmitted through Counter Read Buffer 20, and also routes information to Display 24 and to Detector Latch 9 which directs the Latch to enable or disable the High and/or LO High Voltage Switches. The Counter 17 via the Inverter 21 and Overflow Flip-flop 22 is used to signal the DMA (direct memory access) in the Micro-Processor upon the RESET of the most significant bit (MSB) in the 8 Bit Counter 17, a count of 256. After this information is dealt with internally in the Micro-Processor, a signal from the latter resets the Overflow Flip-flop 22 via the DMA State Decoder 5. This permits a 16 bit extension of the Counter 17 within the Micro-Processor without interrupting the Micro-Processor programming.

Two kinds of count information are displayable under control of the Micro-processor, namely, the radiation level being measured and the accumulated dose. When Display Dose switch 23 is actuated it causes the Micro-processor to signal Write I/O Decoder 3 to enable the Display 24 to decode the accumulated dose information when it is read out of the Memory 2 onto Data Bus 18, the decoded dose data passing into the Display 24, for visible display. When the Dose switch 23 is not actuated, the Write I/O Decoder 3 signals the Display 24 to decode the currently measured radiation level when that information is on the Data Bus from the Memory. The Switch Read Buffers 25 at the appropriate times, under control of the Micro-processor via Read I/O Decoder 4, place onto the Data Bus 18 scale factors corresponding to the HI and LO ranges and a correction factor to correct for circuit delay time. Alarm conditions are indicated by the Alarm 26, and the entire equipment is turned on and off by switch 27.

The Micro-processor operates on a defined time period, as for example two seconds, which is divided into a data processing time of for example 0.3 seconds followed by a data collection time of the remaining part of the two second cycle, or about 1.7 seconds. After power is turned on and the system is initialized, data collection begins. The Micro-processor 1 via Write I/O Decoder 3 and Detector Latch 9 generates a LO enable signal to the LO High Voltage Switch 10 which closes the switch and applies 550 volts D.C. from the H.V. Power Supply 12 to pulse bias the Low Range G-M Detector tube 13 to detect radiation. The LO enable is passed through OR Gate 16 to open the Counter Gate 6 via line 28 and pass the clock pulses to be counted in the Counter 17 which has been cleared by a pulse from the READ I/O Decoder 4 as directed by the Micro-processor. This counting continues until the Detector Latch 9 is cleared either by a pulse from the Probe Output Buffer 15 which is generated by a radiation incident or by a signal from the Micro-processor after the two second Micro-processor defined time period expires. The clearing of the Detector Latch removes the LO enable output which sends a signal to the Micro-processor E flag input and also closes Counter Gate 6 terminating the transmission of clock pulses to the Counter 17.

The signal sent to the Micro-Processor E Flag input via line 28 tells the Micro-Processor that a "strike" has occurred so that the Micro-processor can start counting to wait 1.5 milliseconds to insure that the G-M tube full recovery time has elapsed before sending another enable signal to the High Voltage switch to again pulse bias the G-M tube. After a data collection cycle (I.E. 1.7 seconds), the Micro-Processor disables the G-M tube via the Write I/O Decoder 3, the Detector Latch 9, and LO H.V. Switch, reads into Memory the 24 bit Counter time and the scale factor and circuit delay time from the Switch Read Buffers 25, and after allowing processing time (I.E. 0.3 seconds) causes another signal to be sent to the High Voltage Switch 10 via the Write I/O Decoder 3, the Detector Latch 9 and Data Bus 18 to again pulse bias the G-M tube and start another data collection cycle.

If the radiation field present is too strong for counting with Low Range tube 13, the Micro-processor applies a pulse via the Write I/O Decoder 3 and Data Bus 18 to cause the Detector Latch 9 to generate a HI enable signal to the High Voltage Switch 11 which closes and applies 550 volts D.C. through a capacitor to pulse bias the High Range Detector tube 14 and condition it for radiation detection, the LO Range Detector tube 13 remaining inoperative. The Micro-processor determines that the field is too strong for low range use by monitoring the Counter 17 through the Counter Read Buffer 20 and Overflow Flip-flop 22, and determining that the average time-to-count is less than a pre-set programmed time, as for example six microseconds which equates to a level of five Roentgens per hours. It also determines when a field is too weak for statistically reliable measurement on the high range, and automatically switches to the low range. This is done whenever the time-to-count exceeds for example twenty five thousand (25,000) microseconds, which equates to three Roentgen per hour. This switching as described is accomplished via the Write I/O Decoder 3 and Detector Latch 9. The remaining high range sequence is the same as for the Low Range Detector.

This counting sequence is repeated and a weighted measurement is made in the Memory 2. This measure of the radiation present is normally displayed on the Liquid Crystal Display 24 except, as previously described, when the Display Dose Switch 23 is actuated. The Display is typically updated every two seconds. The Micro-processor will indicate an alarm condition through the Alarm 26 if the radiation present exceeds the alarm level programmed in Memory 2. This alarm could be audible or visual.

Illustrative of the average times to count using the previously given equation and the set of G-M tubes indicated, are the following.

| Field Intensity R/hr | Average Time to Count ($\mu$sec) |
|---|---|
| HIGH RANGE (3G10 G-M tube) | |
| 10,000 | 8.33 |
| 1,000 | 83.33 |
| 100 | 833.3 |
| 10 | 8,333 |
| 1 | 83,333 |
| 0.1 | 833,333 |
| 0.01 | 8,333,333 |
| LOW RANGE (18505 G-M tube) | |
| 10 R/hr | 3.125 |
| 1 R/hr | 31.25 |
| .1 R/hr | 312.5 |
| 10 mr/hr | 3,125 |
| 1 mr/hr | 31,250 |
| .1 mr/hr | 312.500 |
| 0.01 mr/hr | 3,125,000 |

From the above tables it can be seen that by simply measuring the "time to count" parameter, a significant extension of operating range without detector switching is made available. This makes certain features available, if desired, that are denied in other approaches. For example, using a low range frisking probe in conjunction with the 18505 G-M tube could provide a gamma-beta capability in excess of 50 R/hr with excellent linearity and statistical reliability.

In general, there are a number of advantages over other approaches to be realized through use of this new mode of G-M tube operation. Perhaps the most important, however, when considering long term accuracy, stability and overall precision, is that the new method lends itself to a totally digital system. No analog measurements are required, all data and signals are in the form of "ons" and "offs" with the one required reference being a crystal controlled oscillator, a most reliable form of standard. It is to be noted that items such as G-M starting voltage changes, G-M tube plateau length, generation of narrow H.V. pulses or analog variations such as charge per pulse, ion chamber current, MOS FET leakage current, etc. are ameliorated by the "time to count" method of operation. This mode of operation is analogous to operating an ideal detector with zero dead time and simply counting pulses. Operation of that type would produce a linear reduction of the interval between pulses as the field intensity is increased, whereas the method of operation according to the invention produces a linear reduction of the "time to count" as the field intensity increases.

The effect on real time of the tube dead time is removed by virtue of stopping the time measurement for 1.5 milliseconds when a G-M pulse is obtained. Therefore, tube dead time and its effect, which normally produces a non-linear readout, is removed in the new method of operation. As previously indicated, the parameter which is proportional to field intensity is the reciprocal of "average time to count". To obtain this measurement the proposed method requires the division at routine intervals, for example two seconds, of the accumulated G-M tube counts by the total accumulated "time to count". Before this division, however, the time data is adjusted by a calibration constant corresponding to the circuit delay constant. This quotient is then multiplied by a calibration constant corresponding to the G-M tube scale factor and applied to a digital readout to provide the radiation field intensity in mr/hr or R/hr averaged over a certain time period.

The field intensity information in the Mr/hr levels can be presented in the form of a smoothed average with a digital update appearing every two seconds. This removes the necessity of a long waiting period prior to obtaining field intensity readings or updates in low level areas. The R/hr levels can be digitally displayed every two seconds or a running average can be displayed every two seconds. The method of using a running average is similar to the time constant employed in analog measurements except that rapid changes in field strength can be used to clear the previous dose rate information and the new level presented in the very next update display. Total dose information is obtained from the incremental two second field intensity information. Every 2 seconds the dose rate number would be divided by 1800 and stored to provide a continuous record of dose.

An operative program for the illustrated system is as follows for a measured time period data collection cycle, as controlled by the micro-processor.

(1) - Initialize for data collection by zeroing the strike count in the micro-processor.
- Reset 24 bit Hardware/software counter timer to zero.
(2) - Acquire data.
BEGIN
  (a) Enable appropriate detector (HIGH or LOW range)
  (b) Wait for ($b_1$) GEIGER PULSE or
    ($b_2$) CALCULATION TIME
    out flag (interval in Micro-processor)
  ($b_1$) - WHEN GEIGER PULSE OCCURS
    increment by one the
    strike count stored in the Micro-processor and
    wait out geiger tube FULL RECOVERY TIME.
    - IF CALCULATION time out flag,
    THEN BRANCH TO data calculation ($b_2$)
    -ELSE go back to 2(a)
END
  ($b_2$) - WHEN CALCULATION time out flag:
    - Turn off active detector via detector latch (also stops timer)

-continued

```
              - Read 8 bits from Counter into Micro-processor and
                combine with 16 bits of extended count to get
                ACCUMULATED TIME SUM.
                The 24 bit time count = T1 (Accumulated time 1)
              - Read and store range scale and circuit delay factors
       (3)    T2 = T11 − (Number of Strikes × Circuit Delay
              Correction factor
              Calculate FIELD STRENGTH and UPDATE DOSE
       (4)    Divide adjusted sums.
              RATE 1 = EVENT SUM/ACCUMULATED TIME SUM.
              (EVENT = STRIKE)
       (5)    Scale RATE 1 according to HIGH or LOW range scale
              factors.
              RATE 2 = RATE 1 × SCALE FACTOR.
       (6)    Update accumulated DOSE according to RATE (field
              strength).
              DOSE = DOSE + (RATE 2 × 1/1800)
       (7)    Test for DOSE ALARM.
       (8)    Filter rate using digital filter to smooth the display
              RATE 2 filter RATE 3
       (9)    Test for RATE (field strength) ALARM.
              (use RATE 3 for test)
       (10)   Update RANGE flag for next data collection time.
              (Select HI or LO range)
              (use RATE 3 for update)
       (11)   Branch back to (1) and start collecting data.
```

Typically, the components of the block diagram could be the following:

| Micro-processor 1 | CDP 1805 |
|---|---|
| Memory 2 | |
| Address latch | CD 40174 |
| Address decoder | MC 14556 |
| E PROMS | NMC 27C32 |
| RAM | CMD 6116 |
| Detector Latch 9 | CD 40174 |
| Write I/O Decoder 3 | CD 4028 |
| DMA State Decoder 5 | MC 14556 |
| Read I/O Decoder 4 | MM 74C42 |
| High voltage switches 10,11 | 2N5096, 2N5011 |
| Probe Output Buffer 22 | CD 4049 |
| Counter gate 6 and Alarm 26 | CD 4093 |
| Counter 19 | CD 14520 |
| Read Buffers 20,25 | MM 74C244 |
| Overflow Flip-flop 22 | MM 74C374 |
| Display 24 | Hamlin LCD, MC 14543, 74C374 |

Having now described our invention in connection with a particularly illustrated embodiment thereof, variations and modifications of the invention will now naturally occur to those persons normally skilled in the art without departing from the essential scope or spirit of the invention, and accordingly it is intended to claim the same broadly as well as specifically as indicated by the appended claims.

What is claimed to be new and useful is:

1. Apparatus for measuring radiation field strength comprising in combination,
   (a) a biased potential radiation detector having an output circuit, said detector being of the type that is effective when biased to respond to impingement of radiation by generating an output pulse at its output circuit, and when not biased being ineffective to generate an output pulse when impinged by radiation,
   (b) biasing means operatively coupled to said radiation detector for selectively biasing said radiation detector to generate an output pulse in response to impingement by radiation,
   (c) time counting means including timing control means operable to start and terminate time counting, said radiation detector output circuit being operatively coupled to said time counting means and being effective upon generation of an output pulse to cause said time counting means to terminate time counting,
   (d) master control means operatively coupled to
      (1) said biasing means to selectively cause said biasing means to bias said radiation detector to respond to impingement by radiation,
      (2) said time counting means and effective to cause said time counting means to start time counting simultaneously with the operative biasing of said radiation detector, said master control means receiving a signal when said radiation detector generates an output pulse.

2. Apparatus as described in claim 1 wherein said master control means is operatively coupled to said timing control means part of said time counting means to start time counting.

3. Apparatus as described in claim 1 wherein said master control means receives a signal from said radiation detector output circuit through said timing control means part of said time counting means.

4. Apparatus as described in claim 1 wherein said master control means is operatively coupled to said timing control means part of said time counting means to start time counting, and wherein said master control means receives a signal from said radiation detector output circuit through said timing control means part of said time counting means.

5. Apparatus as described in claim 1 wherein said master control means causes said biasing means to bias said radiation detector for response to radiation only when a predetermined time has elapsed after said master control means has received a signal in response to generation of an output pulse by said radiation detector.

6. Apparatus as described in claim 1 wherein said master control means causes said time counting means to start counting time only when a predetermined time has elapsed after said master control means has received a signal in response to generation of an output pulse by said radiation detector.

7. Apparatus as described in claim 1 wherein said master control means simultaneously causes said time counting means to start counting time and causes said biasing means to bias said radiation detector for response to radiation when a predetermined time has elapsed after said master control means has received a signal in response to generation of an output pulse by said radiation detector.

8. Apparatus as described in claim 1 further including memory means operatively coupled to said master control means and to said time counting means, said master control means being operative to transfer time counts in said time counting means to said memory means where the time count information is translated into radiation field intensity information in accordance with the equation $R = K/t$ where R is the radiation field intensity, t is the time over which the time count is made, and K is a constant, said radiation field intensity information being also cumulated in said memory means as cumulative dose information.

9. Apparatus as described in claim 1 wherein said master control means is operatively coupled to said timing control means part of said time counting means to start time counting, wherein said master control means receives a signal from said radiation detector output circuit through said timing control means part of said time counting means, and wherein said master control means simultaneously causes said time counting means to start counting time and causes said biasing means to bias said radiation detector for response to radiation when a predetermined time has elapsed after said master control means has received a signal in response to generation of an output pulse by said radiation detector.

10. Apparatus as described in claim 1 further including a second radiation detector, second biasing means operatively coupled thereto and to said master control means, and further means operatively coupling said master control means to said time counting means effective to convey time count information to said master control means, said second radiation detector being operable in radiation fields too high in intensity for said radiation detector to function in, and said master control means selectively actuating one of said radiation detector and second radiation detector in accordance with time count information conveyed to said master control means from said time counting means.

11. Apparatus as described in claim 1 wherein if after a first time interval said master control means has not received a signal representing the generation of a radiation detector output pulse, said master control means for a second time interval causes said time counting means to terminate time counting and simultaneously causes said biasing means to deactivate said radiation detector, and, after termination of said second time interval said master control means causes said biasing means to again bias said radiation detector and simultaneously causes said counting means to start counting.

12. Apparatus as described in claim 1 wherein said master control means after a first time interval causes said time counting means to terminate time counting for a second time interval, and after termination of said second time interval said master control means causes said biasing means to again bias said radiation detector and simultaneously causes said counting means to start counting.

13. Apparatus as described in claim 1 further including memory means operatively coupled to said master control means and to said time counting means, said master control means being operative to transfer time counts in said time counting means to said memory means where the time count information is translated into radiation field intensity information in accordance with the equation $$R_T = \frac{K \times \Sigma COUNTS}{\Sigma t_{ON}}$$

where $R_T$ is the radiation field intensity over a defined time period, $\Sigma COUNTS$ is the sum of the counts obtained during the total time that said radiation detector is operative during said defined time period, $\Sigma t_{ON}$ is the total time that said radiation detector is operative during said defined time period, and K is a constant, said radiation field intensity information being also cumulated in said memory means as cumulative dose information.

14. Apparatus as described in claim 8 further including radiation rate and dose display means operatively coupled to said master control means and to said memory means, effective responsive to said master control means to selectively display the radiation rate or the cumulated dose information held in said memory means.

15. Apparatus as described in claim 9 further including memory means operatively coupled to said master control means and to said time counting means, said master control means being operative to transfer time counts in said time counting means to said memory means where the time count information is translated into radiation field intensity information in accordance with the equation $R = K/t$ where R is the radiation field intensity, t is time over which the time count is made, and K is a constant, said radiation field intensity information being also cumulated in said memory means as cumulative dose information.

16. Apparatus as described in claim 15 further including radiation rate and dose display means operatively coupled to said master control means and to said memory means, effective responsive to said master control means to selectively display the radiation rate or the cumulated dose information held in said memory means.

17. The method of measuring radiation field strength including the steps of using a master control means in selectively,
(a) activating a radiation detector in a radiation field and simultaneously activating a time counting device to count time,
(b) generating a marker signal in response to radiation detection,
(c) utilizing the marker signal to deactivate the time counting device,
(d) translating the time count registered by the time counting device in accordance with the formula $$R = K/t$$

where,
R is the radiation field intensity
t is the time between activation and deactivation of the time counting device, and
K is a constant.

18. The method as set forth in claim 17 wherein the step of translating the time count includes the steps of,
(a) operating on the time count data to obtain the radiation field strength over a predetermined fixed time interval, and
(b) operating on the just obtained radiation field strength to reduce variations in the data for display.

19. The method as set forth in claim 17 including the further step of displaying the radiation field strength as visible data.

20. The method as set forth in claim 17 including the further step of disabling the radiation detector for a predetermined length of time after generation of the marker signal.

21. The method as set forth in claim 17 including the further step of utilizing the marker signal as a time reference to prevent activation of the radiation detector for a predetermined length of time after generation of the marker signal.

22. The method as set forth in claim 17 including the further steps of continuously repeating the step sequence of claim 17, and for each sequence carrying out the steps of,
(a) operating on the time count data to obtain the radiation field strength over a predetermined fixed time interval, and
(b) operating on the just obtained radiation field strength to reduce variations in the data for display.

23. The method as set forth in claim 17 including the further steps of continuously repeating the step sequence of claim 17, and for each sequence carrying out the steps of,
  (a) operating on the time count data to obtain the radiation field strength over a predetermined fixed time interval,
  (b) adding the obtained radiation field strength to previously stored accumulated dose information, and
  (c) operation on the just obtained radiation field strength to reduce variations in the data for display.

24. The method as set forth in claim 18 including the further step of displaying the radiation field strength as visible data.

25. The method as set forth in claim 18 wherein the step of translating the time count includes the step of modifying the count data by a range scale factor and a circuit delay correction factor.

26. The method as set forth in claim 22 wherein the step of translating the time count includes the step of modifying the count data by a range scale factor and a circuit delay correction factor.

27. The method as set forth in claim 22 including the further step of displaying the radiation field strength as visible data.

28. The method as set forth in claim 23 including the further step of displaying the accumulated radiation dose as visible data.

29. The method of measuring radiation field strength including the steps of using a master control means in selectively,
  (a) activating a radiation detector in a radiation field and simultaneously activating a time counting device to count time,
  (b) generating a marker signal in response to radiation detection,
  (c) utilizing the marker signal to deactivate the time counting device,
  (d) repeating steps (a), (b), and (c) continuously for a defined time period,
  (e) translating the time count registered by the time counting device in accordance with the formula $$R_T = \frac{K \times \Sigma COUNTS}{\Sigma t_{ON}}$$

where,
  $R_T$ is the radiation field intensity over the defined time period
  $\Sigma COUNTS$ is the sum of the Counts obtained during the total time that said radiation detector is activated during said defined time period
  $\Sigma t_{ON}$ is the total time that said radiation detector is activated during said defined time period
  K is a constant.

30. The method as set forth in claim 29 further including after each step (c), the step of waiting a pre-set time interval before commencing step (a).

* * * * *